United States Patent [19]
Teh et al.

[11] Patent Number: 5,636,324
[45] Date of Patent: Jun. 3, 1997

[54] APPARATUS AND METHOD FOR STEREO AUDIO ENCODING OF DIGITAL AUDIO SIGNAL DATA

[75] Inventors: Do-Hui Teh; Ah-Peng Tan, both of Singapore, Singapore

[73] Assignee: Matsushita Electric Industrial Co., Ltd., Osaka-fu, Japan

[21] Appl. No.: 415,159

[22] Filed: Mar. 31, 1995

Related U.S. Application Data

[63] Continuation of Ser. No. 39,840, Mar. 30, 1993, abandoned.

[30] Foreign Application Priority Data

Mar. 30, 1992 [JP] Japan .................................. 4-074546

[51] Int. Cl.$^6$ ........................................................ G10L 9/00
[52] U.S. Cl. ........................................ 315/2.35; 315/2.39
[58] Field of Search ................................. 395/2.1, 2.15, 395/2.2, 2.35–2.39; 381/1, 2, 17, 29, 30, 34, 36, 94

[56] References Cited

U.S. PATENT DOCUMENTS

| | | | |
|---|---|---|---|
| 4,972,484 | 11/1990 | Theile et al. | 395/2.36 |
| 5,285,498 | 2/1994 | Johnston | 395/2.35 |
| 5,323,396 | 6/1994 | Lokhoff | 395/2.1 |

FOREIGN PATENT DOCUMENTS

| | | |
|---|---|---|
| 0402973 | 12/1990 | European Pat. Off. . |
| 4136825 | 3/1993 | Germany . |

OTHER PUBLICATIONS

J. D. Johnston, et al., "Sum–Difference Stereo Transform Coding," 1992 IEEE Int'l Conf on Acoustics, Speech, and Signal Processing, Mar. 23–26, 1992, p. 2:569–72.

D.-H. Teh, "An Improved Stereophonic Coding Scheme Compatible to the [50] MPEG Audio Coding Algorithm," Communications on the Move Conference, Nov. 16–20, 1992, p. 2:437–41.

R.G. Van der Waal, et al., "Subband Coding of Stereophonic Digital Audio Signals", ICASSP 91, vol. 5, pp. 3603–3604 (May 14, 1991).

"Coded Representation of Audio, Picture Multimedia and Hypermedia Information," ISO/IEC JTC 1/SC 29, pp. 212–214 and 334–337 (Apr. 20, 1992).

"Second Draft of Proposed Standard on Information Technology—Coding of Moving Pictures and Associated Audio for Digital Storage Media up to about 1.5 Mbit/s", International Organization for Standardization, pp. 1–32 (Sep. 1990).

"Coding of Moving Pictures and Associated Audio Digital Storage Media at up to about 1.5 Mbit/s Audio Coding Annex", Version 3.2, pp. 1–22 (undated).

"Coding of Moving Pictures and Associated Audio".

"Digital Storage Media at up to about 1.5 Mbit/s Audio Coding Appendix", Version 3.2, pp. 1–98 (undated).

*Primary Examiner*—Allen R. MacDonald
*Assistant Examiner*—Michael A. Sartori
*Attorney, Agent, or Firm*—Ratner & Prestia

[57] ABSTRACT

A stereo audio encoding method for encoding left and right original signals to a left and right reproduced signals for suppressing a loss of quality in the reproduced audio signal. The correlation between the right and left channel signals is determined, and the phase of each signal is compared. If the two signals have the same phase, a modified scale factor is calculated based on a power equalization method, but if the two signals are in opposite phase, another modified scale factor is calculated based on an error minimization method. The modified scale factors are used for calculating the reproduced signals.

14 Claims, 11 Drawing Sheets

APPARATUS AND METHOD FOR STEREO AUDIO ENCODING OF DIGITAL AUDIO SIGNAL DATA

This application is a continuation of application Ser. No. 08/039,840 filed Mar. 30, 1993, now abandoned

BACKGROUND OF THE INVENTION

1. Field of the Invention

The present invention relates to a stereo audio encoding apparatus that is effective for encoding digital audio signal data for digital transmission or storage to a digital data storage medium, and also to a method therefor.

2. Description of the Prior Art

While many digital compression audio coding methods have existed for the last two decades, standardization efforts of digital compression source coding methods for wideband audio signals of 15 kHz or 20 kHz bandwidth have only taken place recently. The Near Instantaneous Companding Audio Multiplex (NICAM) has been adopted as a broadcast standard in the mid 1980s by various countries to produce sounds with quality comparable to FM stereo broadcast. In 1991, a subband coding (SBC) using feedforward quantization scheme, used in conjunction with psychoacoustic modelling, formed the core method of the audio coding standard to be adopted by the ISO/WG11/MPEG (Moving Picture Experts Group). The subband coding scheme would be the audio coding algorithm for coded representation of moving picture information and associated audio at a total data rate of 1.5Mbps (Megabits per second). The bit rates at which the audio coding algorithm must work ranges from 64 kbps (kilobits per second) to 192 kbps per single audio channel.

Figure 5:
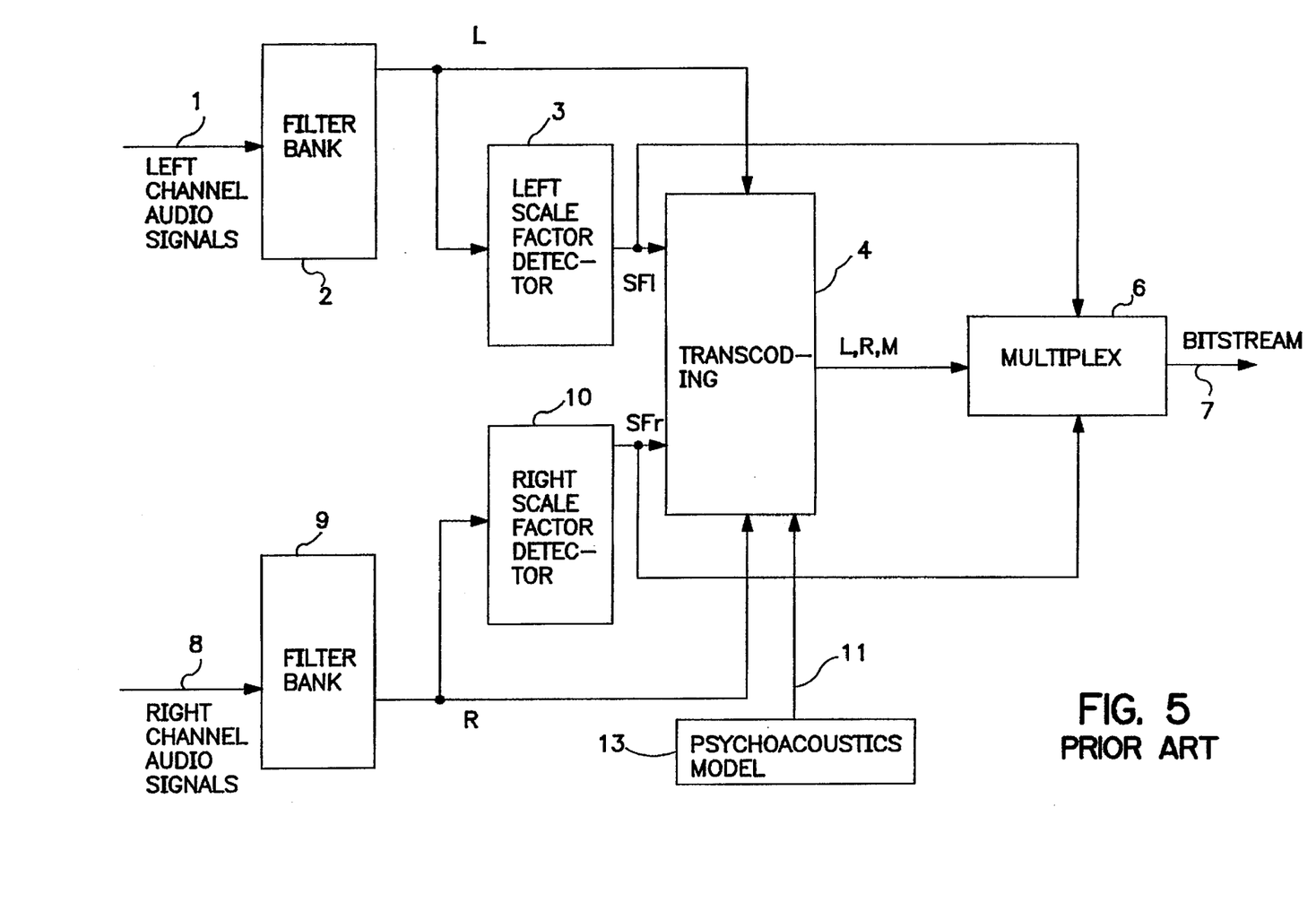
FIG. 5 is a block diagram of the encoder according to the prior art.

Description of the subband coding scheme using quadrature mirror filter for the subband filterbank and using psychoacoustics for the dynamic bit allocation can be found in United States Patent Application of Publication No. 4972484 dated Nov. 20, 1990. Detailed description of a similar subband coding method can be found in the document "Second Draft of Proposed Standard of Information Technology—Coding of Moving Pictures and Associated Audio for Digital Storage Media up to about 1.5 Mbps", Part 3: Audio Coding Standard ISO/IEC JTC1/SC2/WG11 N0043 MPEG 90/001, September 1990. In the latter document, the subband coding is implemented using a polyphase filterbank. In the stereo coding mode of this prior art, the subband encoder involves partitioning of the audio samples of each audio channel into 32 subbands via a polyphase filterbank, FFT analysis to determine psychoacoustic parameters, use of these parameters for adaptive bit allocation to subbands, mid-tread quantization of subband samples and transmission of essential side information. The essential side information includes bit allocation and scale factor data. This is illustrated in FIG. 5. At the decoder, the side information is used for the dequantization. Output samples are reconstructed after passing through an inverse filterbank.

In order to obtain better quality sounds at lower bit rates, it has been proposed in the ISO/MPEG audio algorithm an option of joint stereo coding. Joint stereo coding exploits the interchannel irrelevancy in a stereo pair of audio channels for bitrate reduction. The joint stereo coding used in ISO/MPEG is termed as intensity stereo coding. The purpose of this technique is to increase the sound quality of that obtain at a higher bit rate and/or reduce the bitrate for stereophonic signals. The intensity stereo technique makes use of psychoacoustical results which show that at frequencies above 2 kHz, the localization of the stereophonic image within a critical band is determined by temporal envelope and not by the temporal fine structure of the audio signal. This technique involves the transmission of the summed signals instead of the individual left and right signals for subbands that are to be in the stereo irrelevancy mode. Stereophonic image is preserved by transmitting the scale factors of both the channels. Quantization of the common summed samples, coding of these summed samples and coding of common bit allocation are performed in the same manner as in independent coding of each audio signal.

The intensity stereo scheme suggested in the MPEG document MPEG 90/011 recommends that the left and right subband samples be added. These added values, serving as common subband samples, are scaled in the normal way. The originally determined scale factors of the left and right channel subband signals are transmitted according to the bitstream syntax. Quantization of common subband samples, and coding of common bit allocation are performed in the same way as independent coding. For a very high positive correlation between two channels, this scheme will work. However, for channels with negative correlation, the reproduced sound quality would deteriorate tremendously.

An illustration is provided below using opposite phase left and right signals.

If the magnitude of the original or broadcasted left and right signals L and R in one frame are as follows:

$$L=\{10, 9, 8, 9, 6, -7, 5, -6, 8, 5\}$$

$$R=\{-10, -9, -7, -7, -6, 8, -5, 6, -10, -5\}$$

the maximums $SF_l$ and $SF_r$ of the absolute number in each frame of sampled signals can be expressed as follows:

$$SF_l=10$$

$$SF_r=10$$

These values $SF_l$ and $SF_2$ are referred to as left and right scale factors.

Power $P_1$ in left channel is as follows:

$$P_l = \sum_{i=1}^{n} l_i^2 = 561$$

wherein $l_i$ is a sampled data in signal L and n is the total number of sampled data (which is 10 in this example) Power $P_r$ in right channel is as follows:

$$P_r = \sum_{i=1}^{n} r_i^2 = 565$$

wherein $r_i$ is a sampled data in signal R.

According to the prior art, the left and right sampled signals L and R are reproduced, using the left and right scale factors $SF_l$ and $SF_r$, to signals L' and R' as explained as follows.

An average between the left and right channel signals can be given as follows:

$$\{(l_i+r_i)/2\}=\{0, 0, 0.5, 1, 0, 0.5, 0, 0, -1, 0\}$$

Let $SF_m$, which is the maximum absolute magnitude of the signal obtained from averaging between the left and right channel signals, be termed as the combined scale factor. In this example, $SF_m=1$. The left and right signals are reproduced according to the following equations:

$$L'=SF_l*\{(L+R)/2\}/SF_m$$

$$R'=SF_r*\{(L+R)/2\}/SF_m$$

Thus, $$L'=\{0, 0, 5, 10, 0, 5, 0, 0, -10, 0\}$$

$$R'=\{0, 0, 5, 10, 0, 5, 0, 0, -10, 0\}$$

are obtained and are used for audio signals supplied to left and right speakers.

Reconstructed powers $P_l'$, and $P_l'$, for left and right channels are as follows.

$$P'_l = \sum_{i=1}^{n} l_i'^2 = 250$$

and $$P'_r = \sum_{i=1}^{n} r_i'^2 = 250$$

When the signals L' and R' are used, about 50% of the power is reduced when the reconstruction system of the prior art is used.

SUMMARY OF THE INVENTION

Therefore, an object of the present invention is to provide a stereo audio encoding apparatus and method for suppressing the loss of quality in the reproduced audio signal.

To achieve this object, according to the present invention, a stereo audio encoding method for encoding left and right original signals, each defined by a train of frames and each frame containing a plurality of sampled data, to a left and right reproduced signals, comprising the steps of:

(a) calculating a correlation between said left and right original signals to determine whether the pair of said left and right original signals have an opposite phase characteristics and left and right original signals having a same phase characteristics;

(b) processing said left and right original signals having the opposite phase characteristics according to a power equalization method to obtain said left and right reproduced signals; and (c) processing said left and right original signals having the same phase characteristics according to an error minimization method to obtain said left and right reproduced signals.

Because the signals are encoded using a scale factor modified according to the phase coefficient between plural audio signals, loss of audio signal quality can be prevented at low bit rates.

BRIEF DESCRIPTION OF THE DRAWINGS

The present invention will become more fully understood from the detailed description given below and the accompanying diagrams wherein.

DESCRIPTION OF PREFERRED EMBODIMENTS

The preferred embodiments of the present invention are described below with reference to the accompanying figures.

Figure 1:
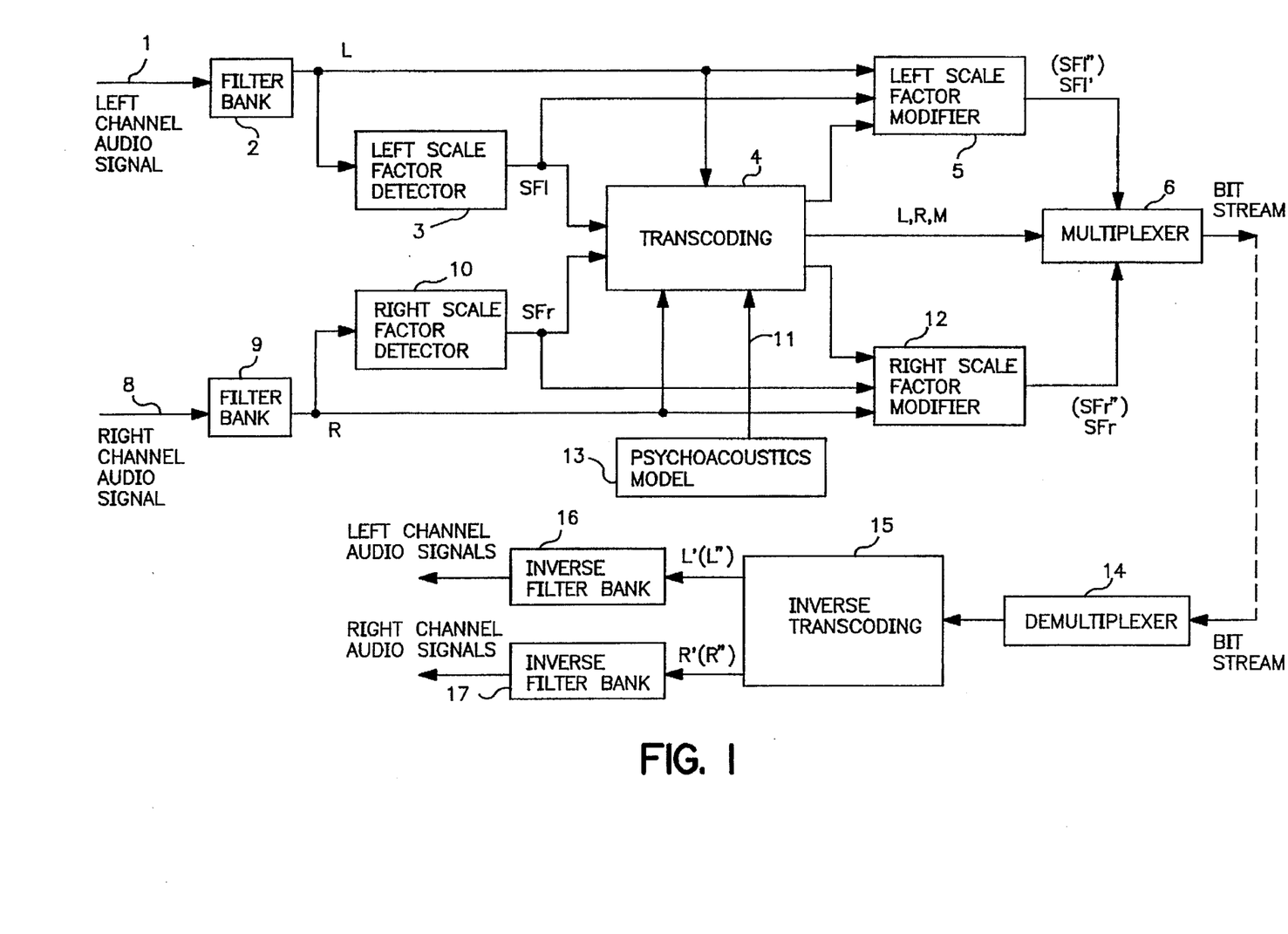
FIG. 1 is a block diagram of the encoder used in the stereo audio encoding apparatus according to the preferred embodiment of the present invention, FIGS. 2a, 2b and 2c taken together as shown in FIG. 2 show a flow chart describing the operation of the encoder used in the preferred embodiment.

Referring to FIG. 1, a stereo audio encoding apparatus according to the present invention has: filter banks 2 and 9 for receiving left and right channel audio signals along lines 1 and 8, respectively; left and right scale factor detectors 3 and 10 for detecting left and right scale factors $SF_l$ and $SF_r$, respectively; transcoding unit 4 for producing scaled left and right samples L, R, and scaled average M of the left and right samples; left and right scale factor modifiers 5 and 12 for modifying the left and right scale factors $SF_l$ and $SF_r$ to $SF'_l$ and $SF'_r$ (or to $SF''_l$ and $SF''_r$); a psychoacoustics model generator 13; and a multiplexer 6 for multiplexing the scale factors, the scaled left, right and average samples L, R and M.

Multiplexer 6 produces left and right scale factors $SF_l$ and $SF_r$ to $SF'_l$ and $SF'_r$ (or to $SF''_l$ and $SF''_r$), and the scaled left, right and average samples L, R and M in a time sharing manner. The signal produced from the multiplexer 6 may be transmitted through a cable or some other data transmission means to a receiver which includes demultiplexer 14, inverse transcoding unit 15, and inverse filter banks 16 and 17.

Filter Bank 2 receives digital audio signal and divides, in frequency domain, the audio signal covering a frequency band of 0–24 kHz into a number of, such as 32, frequency ranges 0–749.999 Hz, 750–1499.999 Hz, 1500–2249.999 Hz, each range covering 750 Hz. Thus, there are 32 outputs from the filter bank 2, but only one output is shown for the sake of brevity. Each output from the filter bank 2 produces digital data sampled at a predetermined sampling rate, such as 0.67 ms. Furthermore, filter bank 2 divides each output, in time domain, into frames, each frame being 8 ms long. Thus, each frame has a train of twelve sampled data.

It is to be noted that, of the 32 outputs, the outputs in the high frequency ranges, such as above 2 kHz are processed according to the intensity stereo method and the low frequency ranges are processed according to the individual stereo method, the details of which are disclosed in (i) U.S. Pat. No. 4,972,484 to Theile et al. issued Nov. 20, 1990, and (ii) "Second Draft of Proposed Standard of Information Technology—Coding of Moving Pictures and Associated Audio for Digital Storage Media up to about 1.5Mbps", Part 3: Audio Coding Standard ISO/IEC JTC1/SC2/WG11 N0043 MPEG 90/001, September 1990, both are understood as being taken herein by reference.

The present invention is particularly directed to the improvement in the intensity stereo method, that is the processing in the high frequency ranges. The improved intensity stereo method according to the present invention has two modes of operations: the first mode is a power equalization mode which is applied to a case when the left and right signals have approximately opposite phase; and the second mode is an error minimization mode which is applied to a case when the left and right signals have relatively similar phase.

The description herein is directed only to the processing of one output from the higher ranges of the 32 outputs, but other outputs from the higher ranges are processed in the same manner.

One frame left signal L from the filter bank 2 is serially applied to transcoding unit 4 which at the same time receives a corresponding one frame right signal R from the filter bank 9. Two examples of left and right signals L and R are shown below.

EXAMPLE 1

$L=\{10, 9, 8, 9, 6, -7, 5, -6, 8, 5\}$ $R=\{-10, -9, -7, -7, -6, 8, -5, 6, -10, -5\}$

EXAMPLE 2

$L=\{10, 9, 8, 9, 6, -7, -5, -6, -8, -5\}$, $R=\{12, 14, 12, 19, 16, -17, -20, -15, -10, -18\}$,

As apparent from the above, Example 1 has almost an opposite phase and therefore operates under the power equalization mode, and Example 2 has a similar phase and therefore operates under the error minimization mode. The detection between these two modes is done as follows.

All the corresponding sampled data between L and R are added, and the absolute of the added sums are added to obtain an evaluation value. In the case of Examples 1 and 2, the evaluation values E1 and E2 are as follows.

$$E1 = \sum_{i=1}^{n} |l_i + r_i| \quad (1)$$
$$= 0+0+1+2+0+1+0+0+$$
$$|-2|+0 = 6$$

$$E2 = \sum_{i=1}^{n} |l_i + r_i| \quad (2)$$
$$= 22+23+30+28+22+|-24|+$$
$$|-25|+|-21|+|-18|+|-23| = 236$$

wherein $l_i$ and $r_i$ are sampled data in left and right signals, respectively.

Then, when the evaluation value is compared with a predetermined value, such as 50, and is determined as the power equalization mode when the evaluation value is less than the predetermined value, and is determined as the error minimization mode when the evaluation value is equal to or greater than the predetermined value. Any other method for detecting the mode can be used.

Figure 6A:
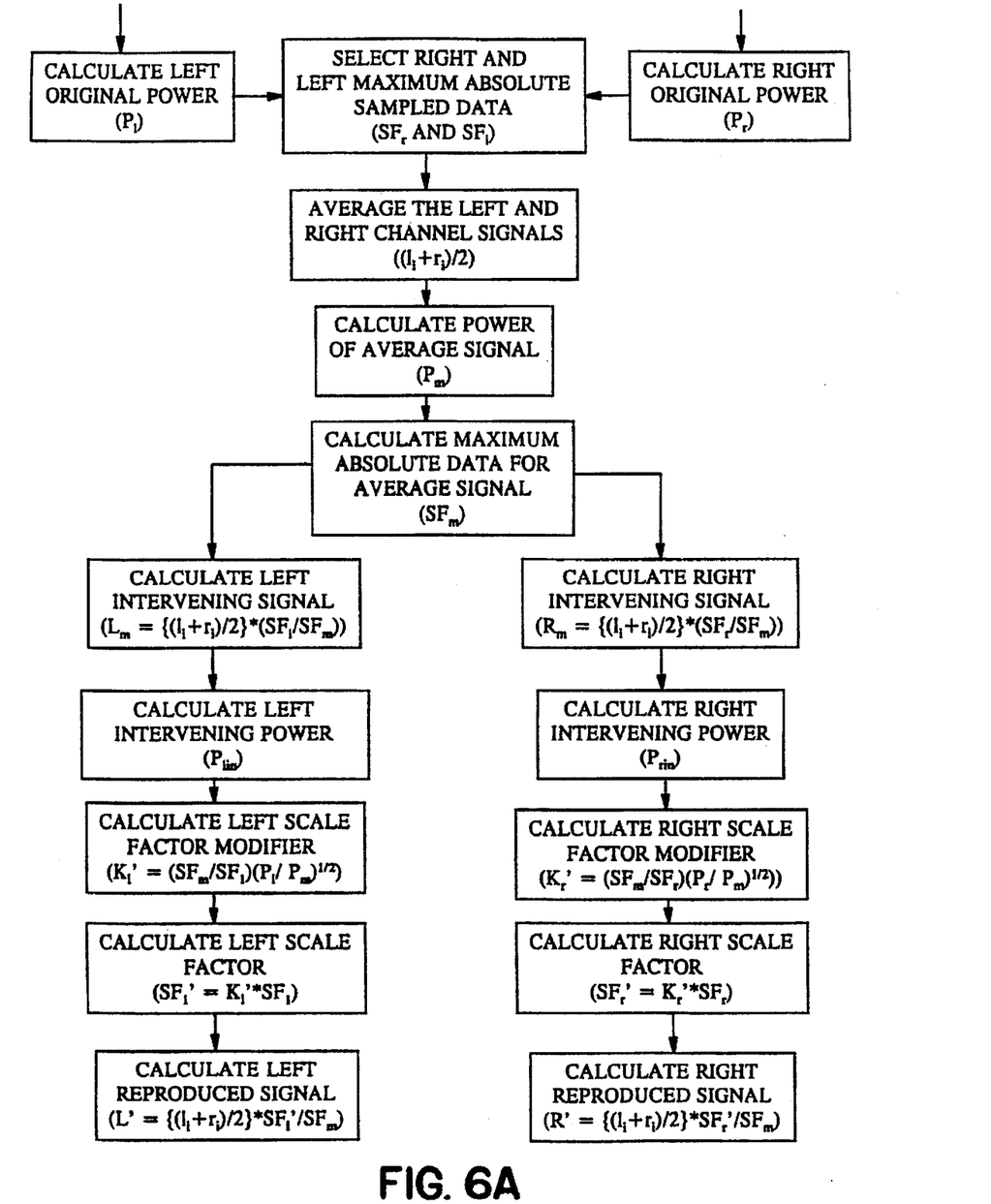
FIGS. 6a and 6b are flowcharts which are useful for illustrating the operation of the exemplary embodiment of the present invention.

First, the operation under the power equalization mode is shown in FIG. 6a and will be described, using the above given Example 1.

When each frame is applied to the scale factor detector 3 (or 10), an absolute value of each sampled data is taken, and the scale factor detector 3 (or 10) produces a maximum absolute sampled data as a left scale factor $SF_l$ (or a right scale factor $SF_r$). In the above Example 1, the left and right scale factors are as follows:

$SF_l=10,$ and $SF_r=10.$

According to the present invention, under the power equalization mode, left and right scale factor modifiers 5 and 12 modify the left and right scale factors $SF_l$ and $SF_r$ to $SF_l'$ and $SF_r'$, respectively, in the steps as described below.

First the power $P_l$ and $P_r$ of the left and right signals L and R are obtained by the following equations:

$$P_l = \sum_{i=1}^{n} l_i^2 = 561 \quad (3)$$

$$P_r = \sum_{i=1}^{n} r_i^2 = 565 \quad (4)$$

wherein $l_i$ is a sampled data in signal L and $r_i$ is a sampled data in signal R.

Then, an average between the left and right channel signals are calculated as follows:

$\{(l_i+r_i)/2\}=\{0, 0, 0.5, 1, 0, 0.5, 0, 0, -1, 0\}$

Then, the scale factor of the combined samples, $SF_m$, which is the maximum absolute data, is calculated. Thus, $SF_m=1$ is obtained.

Also a power of the average signal $P_m$ is obtained by the following equation:

$$P_m = \sum_{i=1}^{n} m_i^2$$

wherein m is the data in the average signal.

Then, intervening signals $L_m$ and $R_m$ are calculated by the following equations:

$L_m = \{(l_i + r_i)/2\}*SF_l/SF_m = \{0, 0, 5, 10, 0, 5, 0, 0, -10, 0\}$ $R_m = \{(l_i + r_i)/2\}*SF_r/SF_m = \{0, 0, 5, 10, 0, 5, 0, 0, -10, 0\}$

The intervening signals $L_m$ and $R_m$ are equal to the reproduced left and right signals used in the prior art.

Then, the power $P_{lm}$ and $P_{rm}$ of the intervening left and right signals $L_m$ and $R_m$ are obtained by the following equations:

$$P_{lm} = \sum_{i=1}^{n} l_i^2 = 250 \quad (5)$$

$$P_{rm} = \sum_{i=1}^{n} r_i^2 = 250 \quad (6)$$

which are not equal to prior art reconstructed powers $P_l$, and $P_r$.

According to the present invention, scale factor modifier $K_l'$ and $K_r'$ are calculated by the following equations:

$$K_l' = \frac{SF_m}{SF_l} \sqrt{\frac{P_l}{P_m}} \quad (7a)$$

$$K_r' = \frac{SF_m}{SF_l} \sqrt{\frac{P_r}{P_m}} \quad (7b)$$

and the following relationships are given.

$SF_l'=K_l'*SF_l$ $SF_r'=K_r'*SF_r$

According to the present invention, and for the example given above, modified left and right scale factors $SF_l'$ and $SF_r'$ are obtained by the following equations.

$$SF'_l = SF_l * \sqrt{\frac{P_l}{P_{lm}}} = 10 \times \sqrt{\frac{561}{250}} \approx 14.98 \quad (8a)$$

$$SF'_r = SF_r * \sqrt{\frac{P_r}{P_{rm}}} = 10 \times \sqrt{\frac{565}{250}} \approx 15.03 \quad (8b)$$

Then, by the use of the modified left and right scale factors $SF'_l$ and $SF'_r$, reproduced left and right signals L' and R' are calculated by the following equations.

$$L' = \{(l_i + r_i)/2\} * SF'_l / SF_m$$
$$= \{0, 0, 7.49, 14.98, 0, 7.49, 0, 0, -14.98, 0\}$$
$$R' = \{(l_i + r_i)/2\} * SF'_r / SF_m$$
$$= \{0, 0, 7.51, 15.03, 0, 7.51, 0, 0, -15.03, 0\}$$

To obtain equations (8a) and (8b), other approaches can be used.

Since the power $P'_l$ and $P'_r$ of the left and right signals L' and R' can be calculated as follows, $$P'_l = \sum_{i=1}^{n} l_i^2 = 562 \quad (9)$$

$$P'_r = \sum_{i=1}^{n} r_i^2 = 565 \quad (10)$$

there is hardly any power change from the power $P_l$ and $P_r$ of the original signal L and R, in the reproduced signals L' and R'. According to the present invention, although it is inevitable that the temporal fine structure of the sound is lost, the power within the temporal envelope is maintained.

Figure 6B:
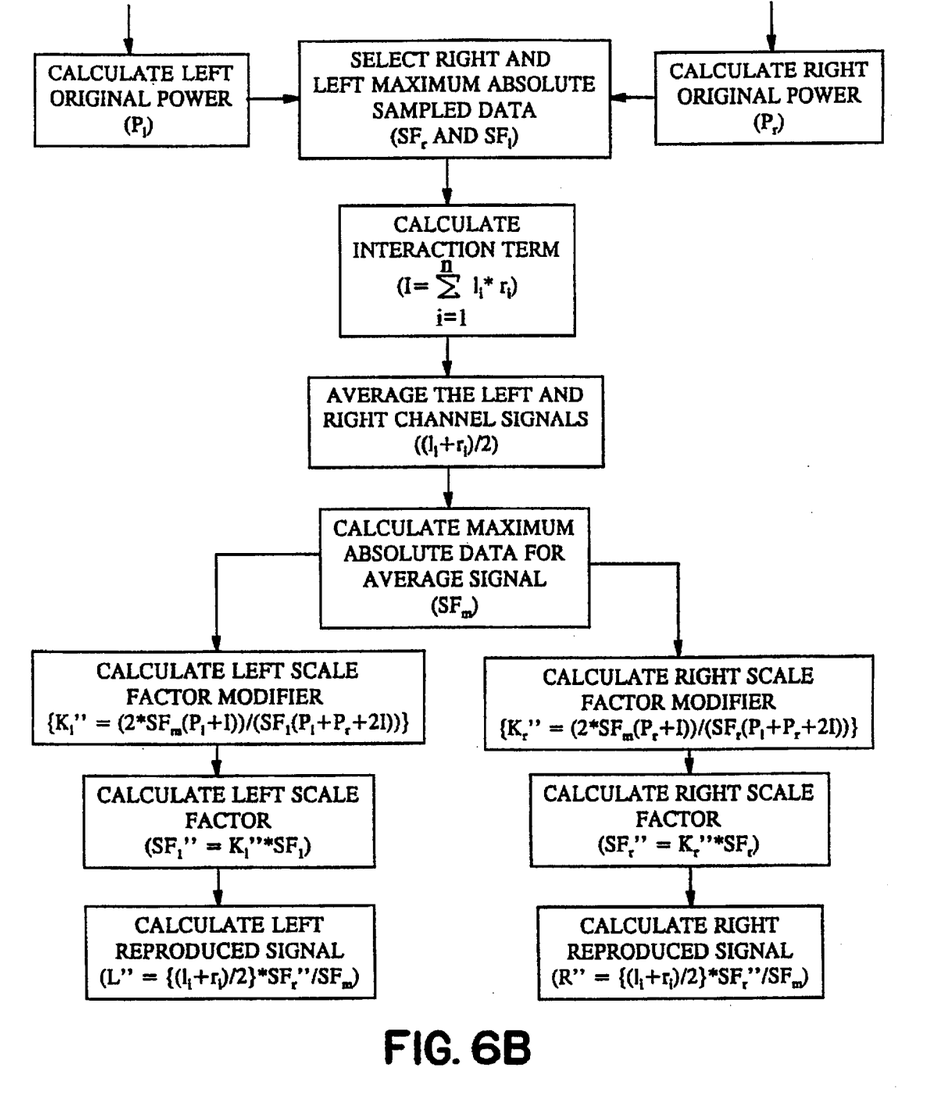

Next, the operation under the error minimization mode is shown in FIG. 6b and will be described, using the above given Example 2.

In a similar manner to the above for the power equalization mode, the left and right scale factors $SF_l$ and $SF_r$ are calculated as follows.

$$SF_l = 10,$$

and $$SF_r = 20.$$

According to the present invention, under the error minimization mode, left and right scale factor modifiers 5 and 12 modify the left and right scale factors $SF_l$ and $SF_r$ to $SF''_l$ and $SF''_r$, respectively, in the steps as described below.

First the power $P_l$ and $P_r$ of the left and right signals L and R are obtained by the following equations:

$$P_l = \sum_{i=1}^{n} l_i^2 = 561 \quad (3')$$

$$P_r = \sum_{i=1}^{n} r_i^2 = 2439 \quad (4')$$

Then, an interaction term I is calculated by the following equation:

$$I = \sum_{i=1}^{n} l_i \cdot r_i = 1088 \quad (11)$$

Also, an average between the left and right channel signals are calculated as follows:

$$\{(l_i + r_i)/2\}$$
$$= \{11, 11.5, 10, 14, 11, -12, -12.5, -10.5, -9, -11.5\}$$

Then, a combined scale factor $SF_m$, which is the maximum absolute sampled data, is obtained. In the above example, $SF_m = 14$.

According to the present invention, scale factor modifier $K''_l$ and $K''_r$ are calculated by the following equations:

$$K''_l = \frac{2 \cdot SF_m(P_l + I)}{SF_l(P_l + P_r + 2I)} \quad (12a)$$

$$K''_r = \frac{2 \cdot SF_m(P_r + I)}{SF_r(P_l + P_r + 2I)} \quad (12b)$$

and the following relationships are given.

$$SF''_l = K''_l * SF_l$$
$$SF''_r = K''_r * SF_r$$

Then, modified left and right scale factors $SF''_l$ and $SF''_r$ are calculated by the following equations:

$$SF''_l = \frac{2 \cdot SF_m(P_l + I)}{P_l + P_r + 2I} = \frac{2 \times 14 \times (561 + 1088)}{561 + 2439 + 2 \times 1088} = 8.92 \quad (13a)$$

$$SF''_r = \frac{2 \cdot SF_m(P_r + I)}{P_l + P_r + 2I} = \frac{2 \times 14(2439 + 1088)}{561 + 2439 + 2 \times 1088} = 19.08 \quad (13b)$$

Then, by the use of the modified left and right scale factors $SF''_l$ and $SF''_r$, reproduced left and right signals L" and R" are calculated by the following equations.

$$L'' = \{(l_i + r_i)/2\} * SF''_l / SF_m$$
$$= \{7.01, 7.33, 6.37, 8.92, 7.01, -7.64,$$
$$-7.96, -6.69, -5.73, -7.33\}$$
$$R'' = \{(l_i + r_i)/2\} * SF''_r / SF_m$$
$$= \{14.99, 15.67, 13.63, 19.08, 14.99, -16.36,$$
$$-17.04, -14.31, -12.27, -15.67\}$$

To obtain equations (13a) and (13b), other approaches can be used.

The errors $D''_l$ and $D''_r$ of left and right channel signals L" and R" with respect to original signal L and R are calculated as follows.

$$D''_l = \sum_{i=1}^{n} (l_i - l''_i)^2 = 35.64 \quad (14)$$

$$D''_r = \sum_{i=1}^{n} (r_i - r''_i)^2 = 35.64 \quad (15)$$

Since the powers $P''_l$ and $P''_r$ of the left and right signals L" and R" can be calculated as follows, $$P''_l = \sum_{i=1}^{n} l_i^2 = 525 \quad (16)$$

$$P''_r = \sum_{i=1}^{n} r_i^2 = 2404 \quad (17)$$

the powers $P''_l$ and $P''_r$ are very close to the powers $P_l$ and $P_r$ of the original signal L and R.

As apparent from the above, in the other case where the left and right channel signals are in phase and in which case the power condition would have been satisfactory, emphasis is given to the finer temporal structure of the audio by ensuring that the signals are reproduced with the minimum error.

Figures 2, 2A:
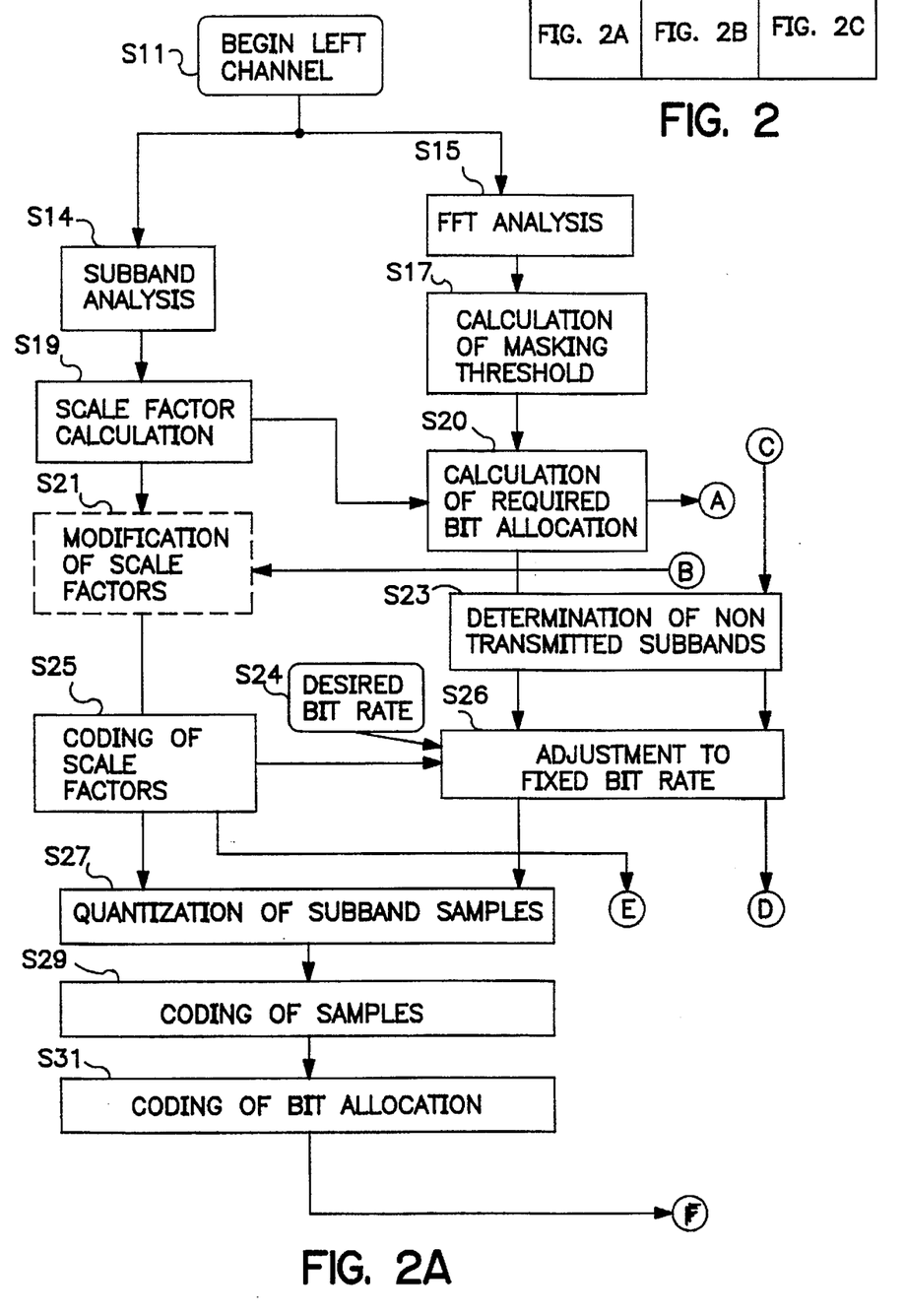
Figure 2B:
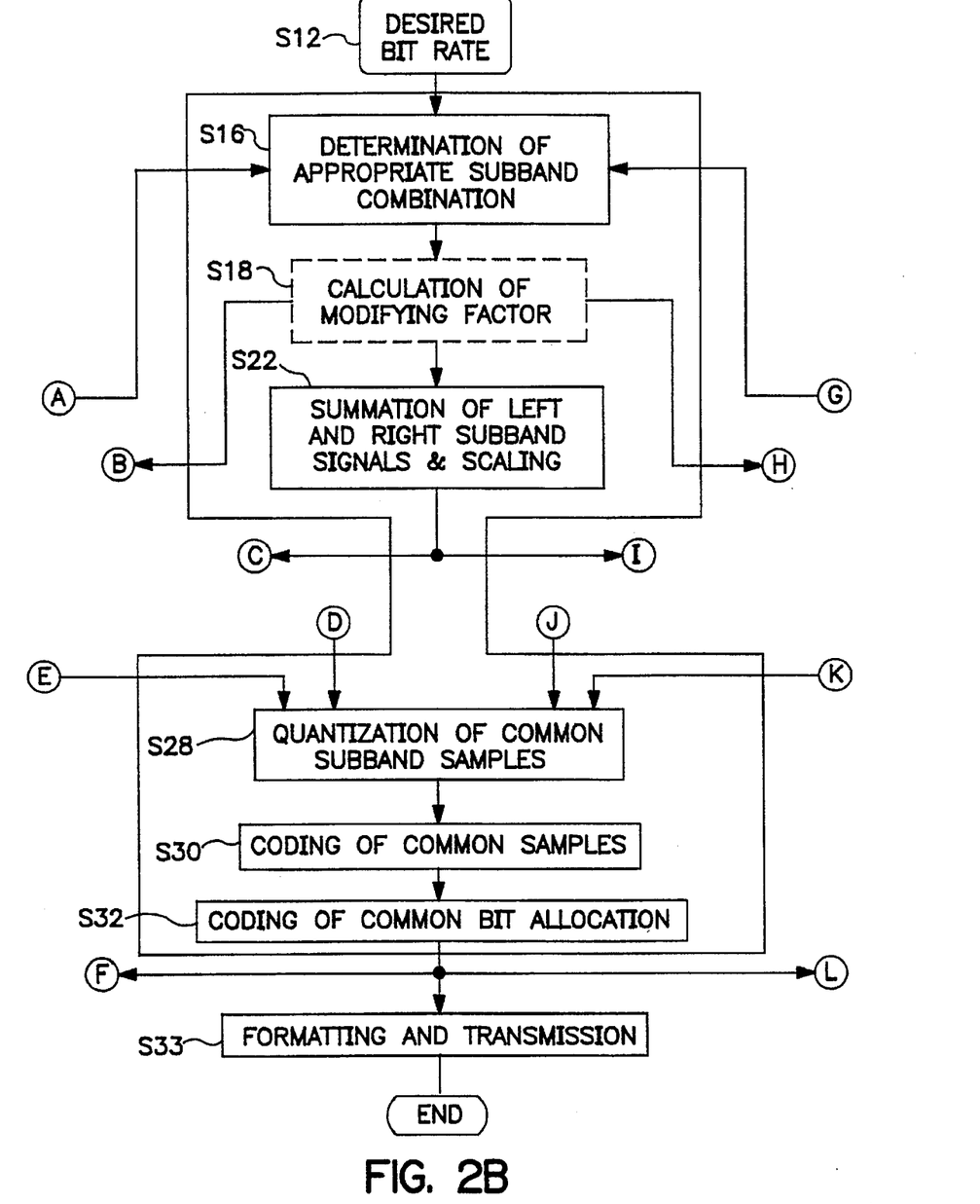
Figure 2C:
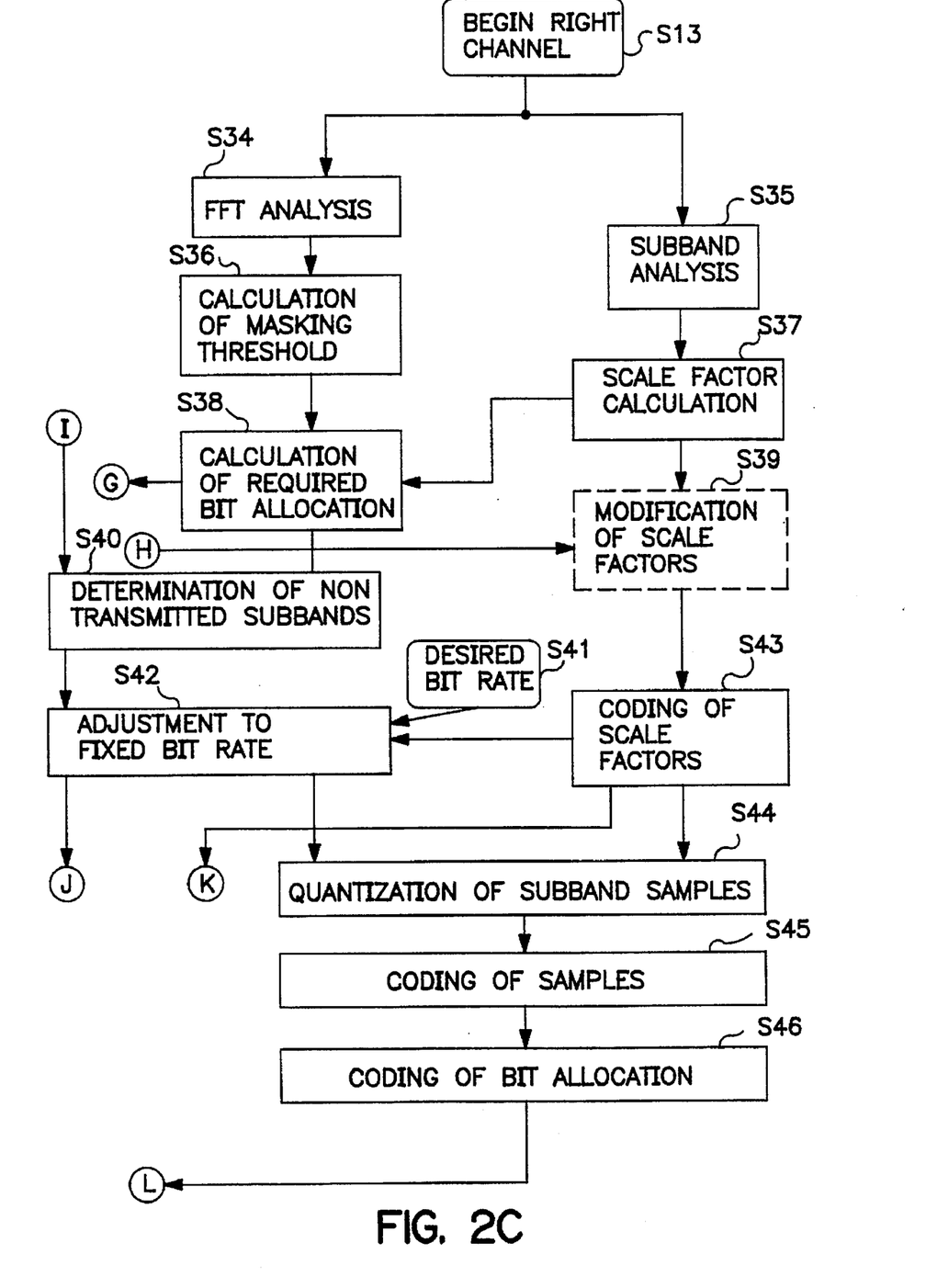

FIGS. 2a, 2b and 2c taken together as shown in FIG. 2 is a flowchart showing operation of the stereo audio encoding apparatus of FIG. 1.

At step S11, left channel signal processing starts. At step S14, the subband analysis is carried out at filter Bank 2 for dividing the signal into subbands (32 frequency ranges) and also dividing into frames.

At step S19, scale factor $SF_l$ is calculated in left scale factor detector 3.

In the meantime, steps S15, S17, S20, S23, S24 and S26 are carried out in the psychoacoustics model generator 13 to determine a bit length of the data in each subband so that the total bit rate, including left and right channels, in one frame is equal to a predetermined bit rate. This is disclosed in detail in the Audio Coding Standard ISO/IEC JTC1/SC2/WG11 N0043 MPEG 90/001.

Also, at step S16, it is detected whether or not the data is in the high frequency range, such as above 2 kHz, or in the low frequency range which should be in intensity stereo. The threshold frequency 2 kHz is not constant but is variable and is determined in transcoding unit 4.

Then, at step S18, scale factor modifiers $K_l'$ and $K_r'$, or $K_l''$ and $K_r''$ are calculated. The detail of step S18 is shown in FIG. 3.

Figure 3:
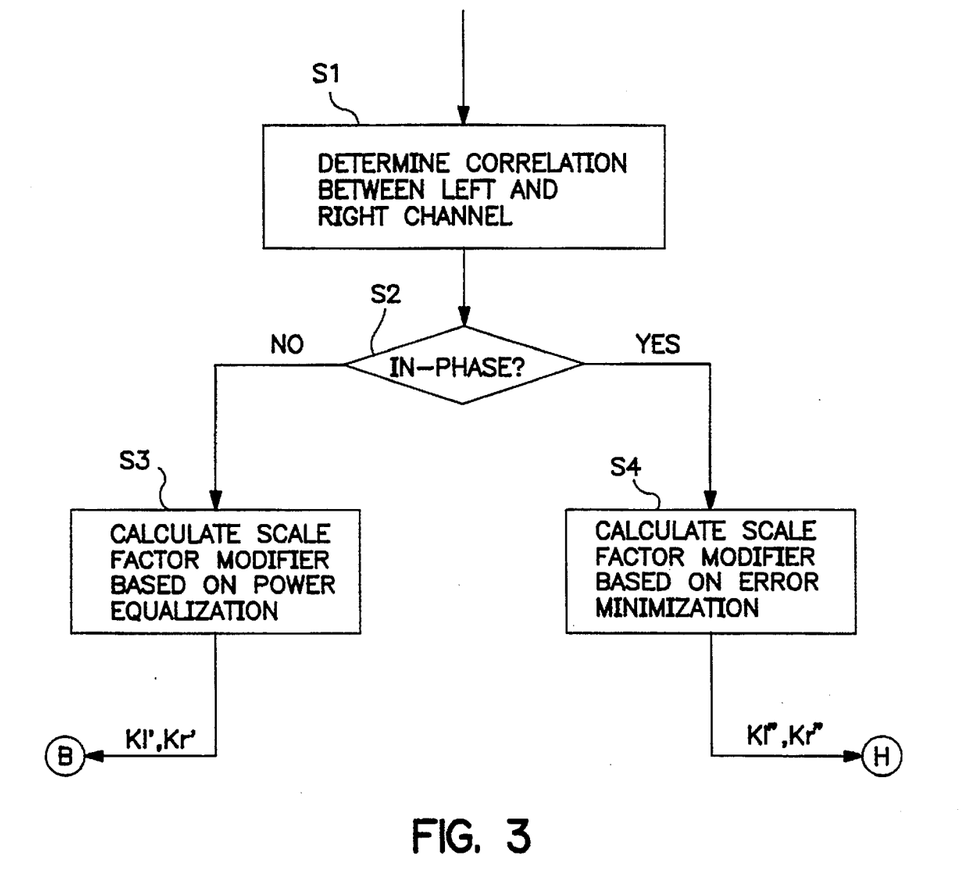
FIG. 3 is a flow chart showing detailed of steps for calculating the scale factor modifier in the preferred embodiment.

Referring to FIG. 3, at steps S1 and S2, it is detected whether or not the left channel signal L and the right channel signal R have a similar phase or an opposite phase. If the signals L and R have a similar phase, step S4 is carried out, and if they have an opposite phase, step S3 is carried out.

At step S3, operation under the power equalization mode is carried out, as explained above so as to produce scale factor modifiers $K_l'$ and $K_r'$.

At step S4, operation under the error minimization mode is carried out, as explained above so as to produce modified scale factors $SF_l''$ and $SF_r''$.

Referring back to FIG. 2a, at step S21, using the scale factor modifier $K_l'$ or $K_l''$, scale factors $SF_l'$ or $SF_l''$ is calculated. This signal is applied to Steps S25, S26, S27, S29 and S31 for a further processing.

Figure 4A:
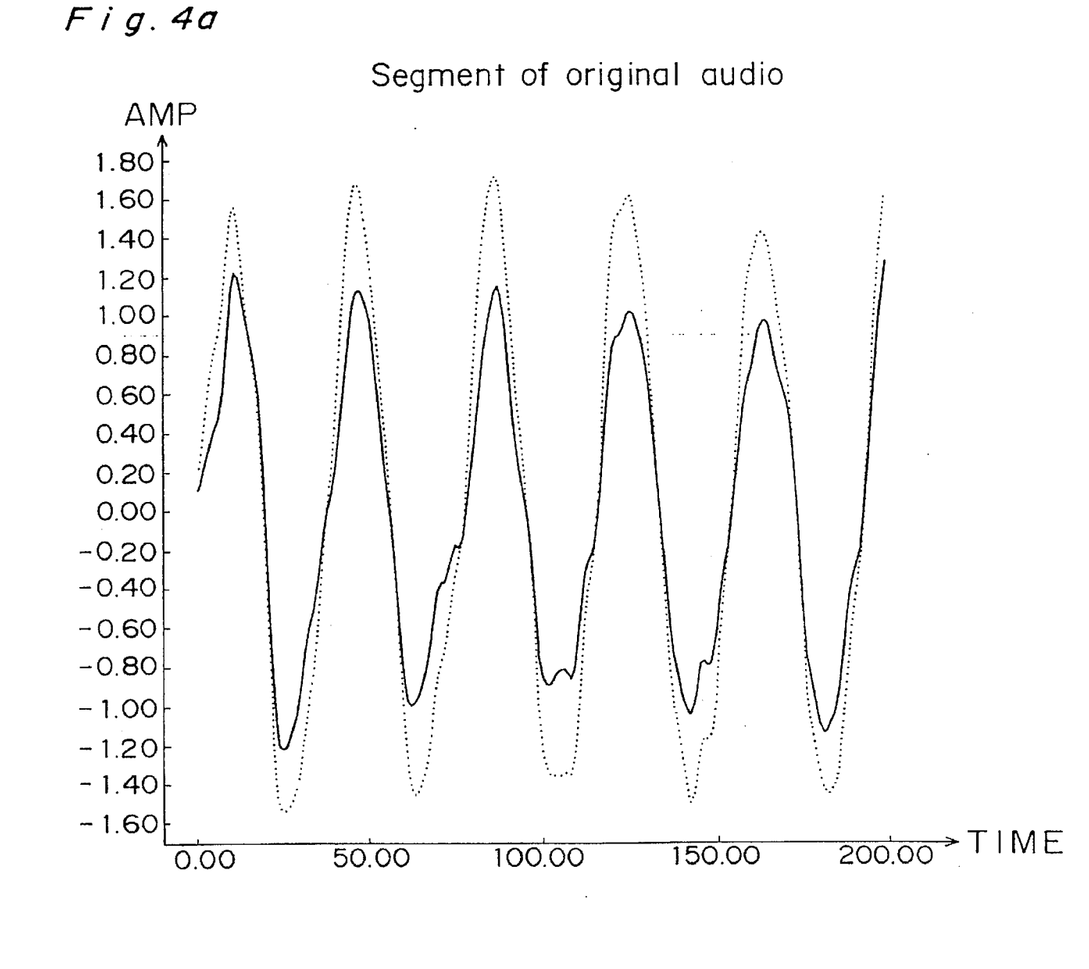
FIG. 4a is a graph showing the original audio signal applied to the encoder of FIG. 1, FIGS. 4b and 4c are graphs showing the right and left channel results of processing the audio signal shown in FIG. 4a by the encoder of FIG. 1.
Figure 4B:
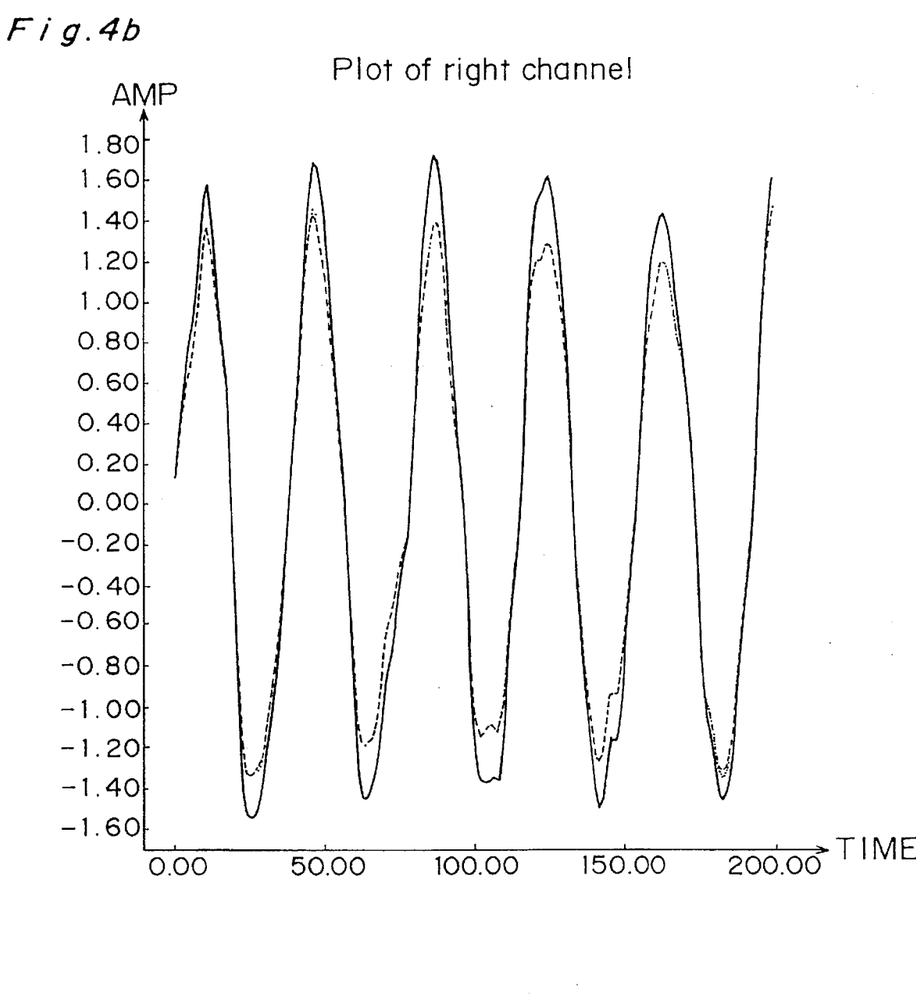
Figure 4C:
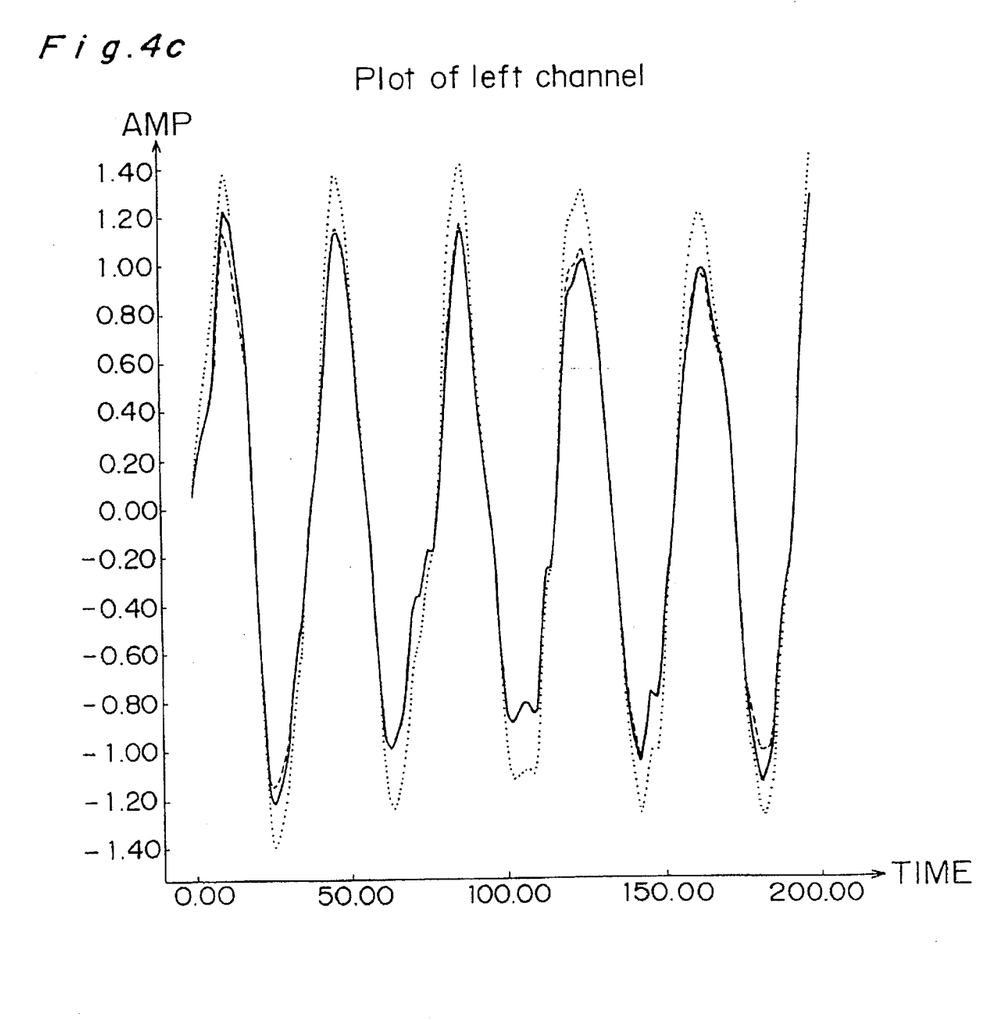

In FIG. 4a a segment of the original input audio signal L (real line) and signal R (dotted line) are shown in which the left and right channel signals have almost the same phase. FIGS. 4b and 4c show the plot of the right and left channels after the coding process, in which a real line shows the original signal, a dotted line shows the results of the prior art, and a dash line shows the results of the invention. It can be observed from the plots that while the results for the right channel of both dotted and dash lines are comparable, the plots of the left channel for the dash line is closer to that of the original than the dotted line.

According to the present invention, the error minimization and power equalization method to modify scale factors may be applied in various audio coding algorithms which use feedforward quantization. The method according to the present invention will improve the quality of high fidelity sounds irrespective of the correlation between the sound channels. The present invention is particularly useful in improving sound quality at lower bit rates where an optimal stereophonic bit reduction scheme is more significant. Subjective quality of the reconstructed audio sequences at 64 kbps per audio channel has shown that the method according to the present invention has resulted in a highly improved sound quality over the intensity stereo coding method suggested in the MPEG audio coding standard.

As will be known to those skilled in the art, the stereo audio encoding method according to the present invention can suppress the loss of sound quality in the reproduced audio signal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A stereo audio encoding method for encoding audio signals to left and right reproduced signals, comprising the steps of:

(a) calculating a correlation between left and right original signals to detect a pair of the left and right original signals having opposite phase characteristics and a pair of the left and right original signals having same phase characteristics, where the audio signals have been transformed to the left and right original signals each defined by a train of frames where each frame contains a plurality of sampled data;

(b) processing the left and right original signals having the opposite phase characteristics according to a power equalization method to obtain said left and right reproduced signals; and (c) processing the left and right original signals having the same phase characteristics according to an error minimization method to obtain said left and right reproduced signals.

2. A stereo audio encoding method as claimed in 1, wherein said processing step (b) comprises the steps of: adding said left and right original signals; and dividing the added signal into left and right reproduced signals relative to a first ratio between (1) a maximum absolute data of an average signal which is an average between said left and right original signals to (2) a maximum absolute sampled data in the left and right original signals and also to a second ratio between (1) a power of the left original signal to (2) a power of d right original signal.

3. A stereo encoding method as claimed in claim 1, wherein said processing step (b) comprises the steps of:

(b1) calculating an average signal which is an average between said left and right original signals;

(b2) respectively selecting a left maximum absolute sampled data and a right maximum absolute sampled data in each frame for each of said left and right original signals;

(b3) calculating (1) a left intervening signal by multiplying said average signal by said left maximum absolute sampled data and (2) a right intervening signal by multiplying said average signal by said right maximum absolute sampled data;

(b4) respectively calculating a left intervening power, a right intervening power, a left original power, and a right original power for each of said left and right intervening signals, and said left and right original signals;

(b5) calculating said left reproduced signal by multiplying said left intervening signal by (1) said left maximum absolute sampled data and (2) a square root of a ratio of the left original power to the left intervening power; and (b6) calculating said right reproduced signal by multiplying said right intervening signal by (1) said right maximum absolute sampled data and (2) a square root of a ratio of the right original power to the right intervening power.

4. A stereo audio encoding method as claimed in claim 1, wherein said processing step (c) comprises the steps of: adding said left and right original signals; and dividing the added signal into left and right reproduced signals relative to a ratio between (1) a power of the left original signal to (2) a power of the right original signal.

5. A stereo audio encoding method as claimed in claim 1, wherein said processing step (c) comprises the steps of:
  (c1) respectively calculating a left power and a right power for each of said left and right original signals;
  (c2) calculating an interaction term by multiplying each of said plurality of sampled data in said left original signal with corresponding data of said plurality of sampled data in said right original signal;
  (c3) calculating an average signal which is an average between said left and right original signals;
  (c4) selecting a maximum absolute sampled data in the average signal;
  (c5) calculating a first ratio of (1) a product of said maximum absolute sampled data multiplied by a sum of said left power and said interaction term to (2) a sum of said right power and said left power and said interaction term;
  (c6) calculating a second ratio of (1) a product of said maximum absolute sampled data multiplied by a sum of said right power and said interaction term to (2) a sum of said right power and said left power and said interaction term;
  (c7) calculating said left reproduced signal by multiplying said average signal by said first ratio; and
  (c8) calculating said right reproduced signal by multiplying said average signal by said second ratio.

6. A stereo encoding method as claimed in claim 1, wherein said processing step (b) comprises the steps of:
  (b1) respectively calculating a left original power, a right original power, a left intervening power, and a right intervening power for each of said left and right original signals, and each of left and right intervening signals wherein said left and right intervening signals are obtained by multiplication of average of the said left and right original signal with a maximum sampled data of said left and right original signals; and
  (b2) calculating said left reproduced signal by multiplying (1) said left intervening signal by a left maximum absolute sampled data for the left original signal together with (2) a square root of a first ratio of the left original power of said left original signal to the left intervening power of said left intervening signal; and
  (b3) calculating said right reproduced signal by multiplying (1) said right intervening signal by a right maximum absolute sampled data for the right original signal together with (2) a square root of a second ratio of the right original power of said right original signal to the right intervening power of said right intervening signal.

7. A stereo audio encoding method as claimed in claim 1, wherein said processing step (c) comprises the steps of:
  (c1) respectively calculating a left power and a right power for each of said left and right original signals;
  (c2) calculating a first ratio of
    (1) a first product of:
      a maximum absolute sampled data of an average of the left and right original signals; and
      a first sum of the left power of said left signal and a first crossproduct of the left and right original signals to
    (2) a second sum of said left power and said right power of said left and right original signals and a second crossproduct of said left and right original signals;
  (c3) obtaining a second ratio of
    (1) a second product of:
      said maximum absolute sampled data of the average of said left and right original signals;
      a third sum of said right power of said right signal and a third crossproduct of said left and right original signals to
    (2) a fourth sum of said left power and said right power of said left and right original signals and a fourth crossproduct of the left and right original signals;
  (c4) obtaining said left reproduced signal by multiplying the average of the left and right original signals by said first ratio; and
  (c5) obtaining said right reproduced signal by multiplying the average of the left and right original signals by said second ratio.

8. A stereo audio encoding apparatus for encoding audio signals to left and right reproduced signals, said apparatus comprising:
  calculating means for calculating a correlation between left and right original signals to detect a pair of the left and right original signals having opposite phase characteristics and a pair of the left and right original signals having same phase characteristics, where the audio signals have been transformed to the left and right original signals each defined by a train of frames where each frame contains a plurality of sampled data;
  first processing means for processing said left and right original signals having the opposite phase characteristics according to a power equalization method to obtain said left and right reproduced signals; and
  second processing means for processing said left and right original signals having the same phase characteristics according to an error minimization method to obtain said left and right reproduced signals.

9. A stereo audio encoding method for encoding audio signals to produce modified scale factors, comprising the steps of:
  (a) calculating a correlation between left and right original signals to detect a pair of the left and right original signals having opposite phase characteristics and a pair of the left and right original signals having same phase characteristics where the audio signals have been transformed to the left and right original signals each defined by a train of frames where each frame contains a plurality of sampled data;
  (b) processing said left and right original signals having the opposite phase characteristics according to a power equalization method to obtain left and right scale factor modifiers; and
  (c) processing said left and right original signals having the same phase characteristics according to an error minimization method to obtain left and right scale factor modifiers.

10. A stereo audio encoding method as claimed in claim 9, wherein said processing step (b) comprises the steps of:
  (b1) calculating an average signal which is an average between said left and right original signals;
  (b2) calculating an average maximum absolute data of said average signal;
  (b3) respectively selecting a left maximum absolute sampled data and a right maximum absolute sampled data in each frame for each of said left and right original signals;

(b4) calculating a left intervening signal by multiplying said average signal by said left maximum absolute sampled data and a right intervening signal by multiplying said average signal by said right maximum absolute sampled data;

(b5) calculating said left scale factor modifier by multiplying a first ratio of (1) said average maximum absolute data to (2) said left maximum absolute sampled data, by a first square root of a second ratio of (1) a left power of the left original signal to an average power of said average signal; and (b6) calculating said right scale factor modifier by multiplying a third ratio of (1) said average maximum absolute data to (2) said right maximum absolute sampled data, by a second square root of a fourth ratio of (1) a right power of the right original signal to the average power of said average signal.

11. A stereo audio encoding method as claimed in claim 9, wherein said processing step (c) comprises the steps of:

(c1) respectively calculating a left power and a right power for each of said left and right original signals;

(c2) calculating an interaction term by multiplying each of said plurality of sampled data in the left original signal with corresponding data of the plurality of sampled data in the right original signal;

(c3) calculating an average signal which is an average between said left and right original signals;

(c4) calculating an average maximum absolute sampled data in the average signal;

(c5) respectively calculating a left maximum absolute sampled data and a right maximum absolute sampled data in each frame for each of said left and right original signals;

(c6) calculating said left scale factor modifier which is equal to a first ratio of (1) a first product of said average maximum absolute sampled data multiplied by a sum of said left power and of said left signal and said interaction term to (2) a second product of said left maximum absolute sampled data in said left original signal multiplied by a sum of said left power and said right power of said left and right original signals and said interaction term; and (c7) calculating said right scale factor modifier which is equal to a second ratio of (1) a third product of said average maximum absolute sampled data multiplied by a sum of said right power of said right signal and said interaction term to (2) a fourth product of said right maximum absolute sampled data in said right original signal multiplied by a sum of said left power and said right power of said left and right original signals and said interaction term.

12. (Amended) A stereo encoding method as claimed in claim 9, wherein said processing step (b) comprises the steps of:

(b1) respectively calculating a left original power, a right original power, a left intervening power, and a right intervening power for each of said left and right original signals, and each of said left and right intervening signals wherein said left and right intervening signals are obtained by multiplication of average of the left and right original signal with a maximum sampled data of said left and right original signals; and (b2) calculating said left reproduced signal by multiplying (1) said left intervening signal by a left maximum absolute sampled data for the left original signal together with (2) a square root of a first ratio of the left original power of said left original signal to the left intervening power of said left intervening signal; and (b3) calculating said right reproduced signal by multiplying (1) said right intervening signal by a right maximum absolute sampled data for the right original signal together with (2) a square root of a second ratio of the right original power of said right original signal to the right intervening power of said right intervening signal.

13. A stereo audio encoding method as claimed in claim 9, wherein said processing step (c) comprises the steps of:

(c1) respectively calculating a left power and a right power for each of said left and right original signals;

(c2) calculating a first ratio of
(1) a first product of:
a maximum absolute sampled data of an average of the left and right original signals; and
a first sum of the left power of said left signal and a first crossproduct of the left and right original signals to
(2) a second sum of said left power and said right power of said left and right original signals and a second crossproduct of said left and right original signals;

(c3) obtaining a second ratio of
(1) a second product of:
said maximum absolute sampled data of the average of said left and right original signals;
a third sum of said right power of said right signal and a third crossproduct of said left and right original signals to
(2) a fourth sum of said left power and said right power of said left and right original signals and a fourth crossproduct of the left and right original signals;

(c4) obtaining said left reproduced signal by multiplying the verage of the left and right original signals by said first ratio; and (c5) obtaining said right reproduced signal by multiplying the average of the left and right original signals by said second ratio.

14. A stereo audio encoding apparatus for encoding audio signals to produce modified scale factors, said apparatus comprising:

calculating means for calculating a correlation between left and right original signals to detect a pair of the left and right original signals having opposite phase characteristics and a pair of the left and right original signals having same phase characteristics, where the audio signals have been transformed to the left and right original signals each defined by a train of frames where each frame contains a plurality of sampled data;

first processing means for processing said left and right original signals having the opposite phase characteristics according to a power equalization method to obtain the left and right scale factor modifiers; and second processing means for processing said left and right original signals having the same phase characteristics according to an error minimization method to obtain the left and right scale factors modifiers.

* * * * *

UNITED STATES PATENT AND TRADE MARK OFFICE
CERTIFICATE OF CORRECTION

PATENT NO.  : 5,636,324
DATED       : June 3, 1997
INVENTOR(S) : Teh et al.

It is certified that error appears in the above-identified patent and that said Letters Patent is hereby corrected as shown below:

On the cover page, item [56] References Cited, Other Publications, "Coding of Moving Pictures and Associated". "Digital Storage Media at up to about 1.5 Mbit/s Audio Coding Appendix" should be CODING OF MOVING PICTURES AND ASSOCIATED AUDIO DIGITAL STORAGE MEDIA AT UP TO ABOUT 1.5 Mbit/s AUDIO CODING ANNEX Column 14, line 40, "verage" should be --average--.

Signed and Sealed this

Nineteenth Day of January, 1999

Attest:

Attesting Officer

*Acting Commissioner of Patents and Trademarks*